US010852317B1

(12) United States Patent
Guo et al.

(10) Patent No.: US 10,852,317 B1
(45) Date of Patent: Dec. 1, 2020

(54) LOWERED ACOUSTIC DOPPLER CURRENT PROFILER, UTRA-SHORT BASELINE (LADCP-USBL) COMBINED OBSERVATION AND DATA PROCESSING METHOD AND APPARATUS

(71) Applicant: FIRST INSTITUTE OF OCEANOGRAPHY, MNR, Qingdao (CN)

(72) Inventors: Jingsong Guo, Qingdao (CN); Zhixin Zhang, Qingdao (CN); Yuhuan Xue, Qingdao (CN); Dapeng Qu, Qingdao (CN)

(73) Assignee: FIRST INSTITUTE OF OCEANOGRAPHY, MNR, Qingdao (CN)

( * ) Notice: Subject to any disclaimer, the term of this patent is extended or adjusted under 35 U.S.C. 154(b) by 0 days.

(21) Appl. No.: 16/912,723

(22) Filed: Jun. 26, 2020

(30) Foreign Application Priority Data

Jul. 3, 2019 (CN) .......................... 2019 1 0603476

(51) Int. Cl.
*G01P 5/24* (2006.01)
(52) U.S. Cl.
CPC .................. *G01P 5/241* (2013.01)
(58) Field of Classification Search
CPC . G06F 16/215; G06F 16/2462; G06F 16/2477
See application file for complete search history.

(56) References Cited

U.S. PATENT DOCUMENTS

| 10,303,995 B2* | 5/2019 | Kukulya ......... G06K 19/07749 |
| 10,691,993 B2* | 6/2020 | Kukulya ................. G01S 7/521 |
| 2004/0100867 A1* | 5/2004 | Brunet ................. G01V 1/3835 367/89 |
| 2018/0082166 A1* | 3/2018 | Kukulya ................. G01S 7/521 |
| 2019/0279067 A1* | 9/2019 | Kukulya ......... G06K 19/07749 |

FOREIGN PATENT DOCUMENTS

CN 110263075 A * 9/2019

OTHER PUBLICATIONS

Wu, Xuewen, et al., Ultrashort Baseline Underwater Acoustic Positioning Data Processing, Journal of Hangzhou University of Electronics Technology, vol. 31, No. 4, pp. 53-56, Aug. 15, 2011).

* cited by examiner

*Primary Examiner* — Daniel Pihulic
(74) *Attorney, Agent, or Firm* — Greenberg Traurig LLP (57) ABSTRACT

The present disclosure provides a LADCP-USBL combined observation and data processing method and an apparatus. According to one embodiment, an exemplary method may include: acquiring bottom tracking data from the LADCP, position trajectory data collected by the USBL, and ocean current data collected by the LADCP; removing abnormal data points from the position trajectory data; performing azimuth angle correction on the position trajectory data according to the bottom tracking data to determine a movement velocity of the LADCP; and calculating an absolute ocean current velocity according to the movement velocity of the LADCP and the ocean current data.

13 Claims, 7 Drawing Sheets

LOWERED ACOUSTIC DOPPLER CURRENT PROFILER, UTRA-SHORT BASELINE (LADCP-USBL) COMBINED OBSERVATION AND DATA PROCESSING METHOD AND APPARATUS

CROSS-REFERENCE TO RELATED APPLICATIONS

This application claims benefit and priority of Chinese patent application No. 201910603476.7 filed on Jul. 3, 2019, published as CN110263075A (Appendix A), granted as CN110263075B (Appendix B), and entitled "LADCP-USBL Combined Observation and Data Processing Method", the contents of all of which are incorporated herein by reference and via enclosure in their entirety.

TECHNICAL FIELD

The present disclosure relates to the technical field of observation of ocean currents, and in particular to a LADCP-USBL combined observation and data processing method (method for observation and data processing with LADCP and USBL used in combination).

BACKGROUND ART

In the prior art solution for the calculation of the ocean current velocity, the ocean current velocity is usually calculated by LADCP (Lowered Acoustic Doppler Current Profiler), but the movement velocity of the LADCP cannot be accurately determined, which results in a large error and inaccuracy in the calculation of the ocean current velocity.

OVERVIEW

In view of this, an objective of the present disclosure is to provide a LADCP-USBL combined observation and data processing method.

An embodiment of the present disclosure provides LADCP-USBL combined observation and data processing method, comprising: acquiring bottom tracking data from the LADCP, position trajectory data collected by the USBL, and ocean current data collected by the LADCP; removing abnormal data points from the position trajectory data; performing azimuth angle correction on the position trajectory data according to the bottom tracking data to determine a movement velocity of the LADCP; and calculating an absolute velocity of ocean current according to the movement velocity of the LADCP and the ocean current data.

An embodiment of the present disclosure further provides a LADCP-USBL combined observation and data processing apparatus, comprising: a data acquisition module configured to acquire bottom tracking data from the LADCP, position trajectory data collected by the USBL, and ocean current data collected by the LADCP; a quality control module configured to remove abnormal data points from the position trajectory data; an azimuth angle correction module configured to perform azimuth angle correction on the position trajectory data according to the bottom tracking data to determine a movement velocity of the LADCP; and an ocean current velocity module configured to calculate an absolute velocity of ocean current according to the movement velocity of the LADCP and the ocean current data.

An embodiment of the present disclosure further provides an electronic device, comprising a processor and a memory, wherein the memory is configured to store computer-executable instructions executable by the processor, and the processor is configured to execute the computer-executable instructions to implement the steps of the LADCP-USBL combined observation and data processing method described above.

Additional features and advantages of the present disclosure will be set forth in the description which follows, or in part will be inferred or undoubtedly determined from the description, or may be learned by practice of the above techniques of the present disclosure.

In order to enable clearer and easier understanding of the above objects, features, and advantages of the present disclosure, preferred embodiments will be described in detail below by way of example with reference to the accompanying drawings.

BRIEF DESCRIPTION OF DRAWINGS

In order to more clearly illustrate technical solutions in specific embodiments of the present disclosure or in the prior art, drawings required for use in the description of the specific embodiments or the prior art will be described briefly below. It is apparent that the drawings in the following description are illustrative of some embodiments of the present disclosure. It will be understood by those of ordinary skill in the art that other drawings can also be obtained from these drawings without any inventive effort.

DETAILED DESCRIPTION OF EMBODIMENTS

In order to further clarify the objects, technical solutions, and advantages of the embodiments of the present disclosure, the technical solutions of the present disclosure will be described below clearly and completely with reference to the accompanying drawings. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

At present, in technologies related to the calculation of the velocity of an ocean current by using a LADCP (Lowered Acoustic Doppler Current Profiler), the LADCP is usually bundled with a CTD (Conductivity-Temperature-Depth) profiler and moved upward and downward together with the CTD underwater unit, and is lowered from the sea surface to the seabed and then raised from the seabed to the sea surface at a certain speed so as to obtain a series of individual current velocity sub-profiles. It is necessary to perform subsequent materials (data) processing and superimposing calculation using these current velocity sub-profiles to obtain a current velocity profile over the entire measurement depth.

The current velocity measured in one profile is the velocity of seawater with respect to the LADCP instrument, and in order to obtain an absolute velocity of seawater, the movement velocity of the LADCP is required to be acquired. It is difficult to determine the movement velocity of the LADCP because the LADCP moves in the water with the hull of a ship and the water current.

In the prior art methods of measuring the velocity of an ocean current by using a LADCP, the ocean current velocity is usually calculated by the LADCP, but it is difficult to determine the movement velocity of the LADCP. In the prior art solution, a reference velocity based on the ship velocity, or the LADCP velocity at the tracking part in a near-bottom layer, or the velocity measured by an upper onboard LADCP during operation, or the like, is provided for the calculation of the movement velocity of the LADCP. There are certain errors in the prior art methods for calculation of the movement velocity of the LADCP, therefore the movement velocity of the LADCP cannot be accurately and objectively given. Therefore, the movement velocity of the LADCP cannot be accurately determined, which results in a large error and inaccuracy in the calculation of the ocean current velocity. On this basis, embodiments of the present disclosure provide a LADCP-USBL combined observation and data processing method. This technology is applicable to the calculation of ocean current velocities by using a LADCP, and is especially applicable to the LADCP-USBL combined calculation of the ocean current velocities.

Figure 1:
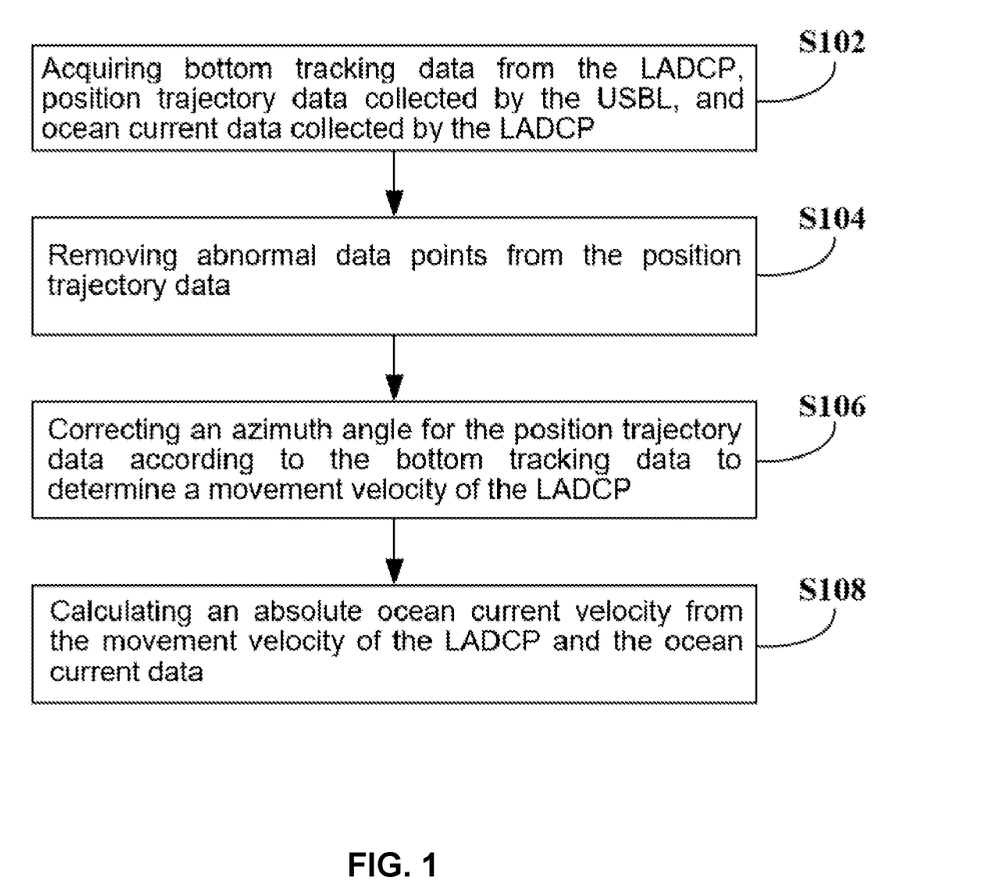
FIG. 1 is a flowchart of a LADCP-USBL combined observation and data processing method according to an embodiment of the present disclosure.

In view of the above-mentioned technical problems, an embodiment of the present disclosure provides a LADCP-USBL combined observation and data processing method to accurately determine the movement velocity of the LADCP, improve the accuracy of the calculation of ocean current velocities, and reduce errors in the calculation of ocean current velocities. As shown in FIG. 1, the method includes the following steps:

Step S102: acquiring bottom tracking data from a LADCP, position trajectory data collected by a USBL (Ultra-short Baseline acoustic position system), and ocean current data collected by the LADCP.

The LADCP is a new measurement means for ocean current profiles which appeared in the 1990s, in which a specially-made ADCP (Acoustic Doppler Current Profiler) is lowered to the seabed and recovered to the sea surface at a certain speed by using a winch and ocean current profiles are continuously measured in the process of lowering or recovering, so that the ocean current velocities over the full depth profile are obtained by data inversion. The USBL is an underwater positioning system capable of providing precise positioning information for underwater survey equipment. The bottom tracking technology refers to a LADCP tracking movement at a river bottom or a sea bottom by receiving and processing echo signals from the river bottom or the sea bottom. The position trajectory data refers to data about a position trajectory of the LADCP moving with time, and the ocean current data refers to data related to the observed ocean current, which is used for calculation of the ocean current velocity. The bottom tracking data refers to data obtained by the LADCP using the bottom tracking technology.

Step S104: removing abnormal data points from the position trajectory data.

An abnormal data point refers to a data point involving obvious errors or mistakes which is about the position trajectory data about LADCP. The abnormality results from random causes, which may be due to many factors such as the instrument or the environment or the like. The removal of abnormal data points is also called quality control. The magnitude of the movement velocity of the LADCP can be obtained by the quality control.

Step S106: correcting an azimuth angle of the position trajectory data according to the bottom tracking data to determine a movement velocity of the LADCP.

The azimuth angle correction refers to a method of correcting a deviation between an azimuth angle included in the data on position trajectory in the near-bottom layer and an azimuth angle of the instrument movement velocity of the LADCP using bottom tracking. The direction of the movement velocity of the LADCP can be obtained by the azimuth angle correction, which can be combined with the quality control to determine the movement velocity of the LADCP.

Step S108: an absolute velocity of ocean current is calculated according to the movement velocity of the LADCP and the ocean current data.

The movement velocity of the LADCP is obtained by the steps S102 to S106, and then can be combined with the ocean current data measured by the LADCP to accurately calculate an absolute velocity of ocean current.

In an embodiment of the present disclosure, after abnormal data points are removed from position trajectory data collected by the USBL, azimuth angle correction is performed on the position trajectory data using bottom tracking data to determine a movement velocity of the LADCP, and an absolute velocity of ocean current is calculated according to the movement velocity of the LADCP and ocean current data collected by the LADCP. In this way, the movement velocity of the LADCP can be accurately determined, accuracy of calculation of the ocean current velocity can be improved, and error of the calculation of the ocean current velocity can be reduced.

An embodiment of the present disclosure further provides another LADCP-USBL combined observation and data processing method. This method is implemented on the basis of the method described above. In this method, an implementation of removal of abnormal data points from the position trajectory data is mainly described.

Figure 2:
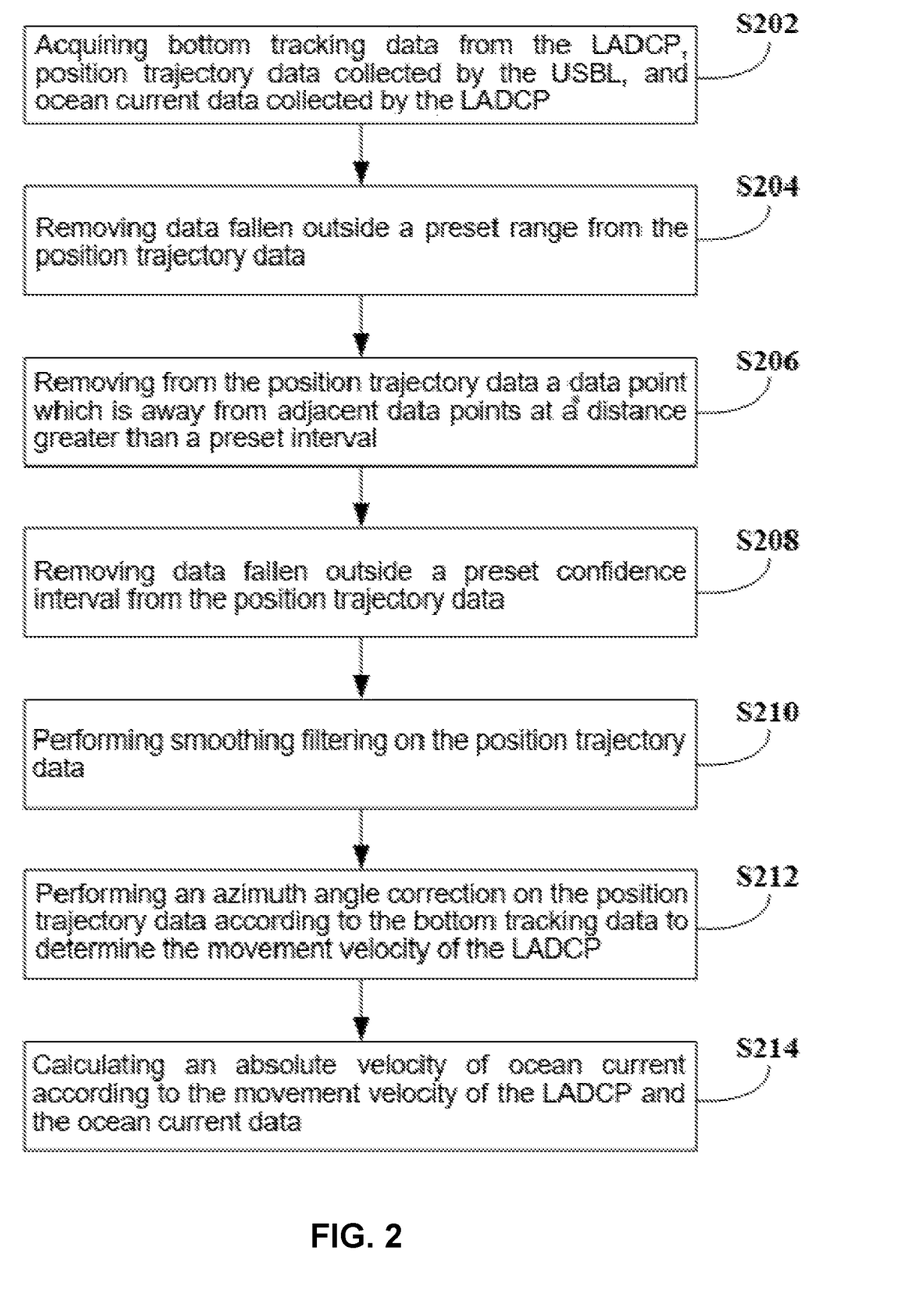
FIG. 2 is a flowchart of another LADCP-USBL combined observation and data processing method according to an embodiment of the present disclosure.

As shown in FIG. 2, this method comprises the following steps:

Step S202: acquiring bottom tracking data from the LADCP, position trajectory data collected by the USBL, and ocean current data collected by the LADCP.

The USBL determines the position of an underwater target by measuring the azimuth and distance of arrival position of a signal, and the measurement is realized by measuring a phase difference between array elements of a receiving array at which the signal arrives. The main components of the USBL comprise a transducer array and an underwater transponder. The transducer array consists of a transmitter transducer element and four reception transducer elements. The transmitter transducer element of the USBL is configured to transmit an acoustic signal. When the underwater transponder receives the signal from the transmitter transducer element, the underwater transponder transmits a reply signal, and each of the four receiving elements of the array is configured to receive the reply signal. A slant distance from the target is calculated by measuring the time during which the acoustic wave travels from the underwater transponder to the transducer array, and a phase difference between the acoustic waves arriving at the respective hydrophones of the array from the target is measured to calculate a pitch angle and the azimuth angle of the target so as to determine the relative position of the target with respect to the transducer array, which is then combined with the position, attitude, and heading provided by an external GPS (Global Positioning System), an attitude sensor, and a compass so as to calculate the underwater coordinates of the underwater transponder.

Figure 3:
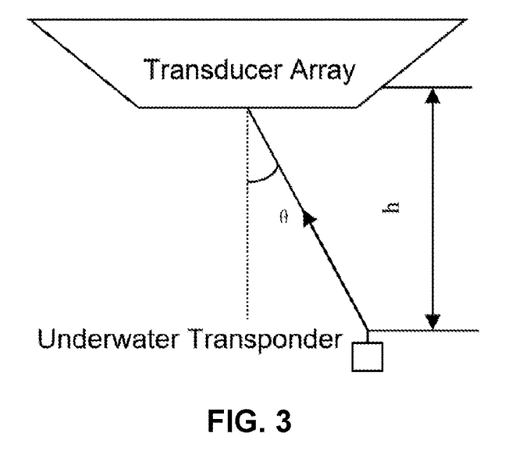
FIG. 3 is a schematic diagram showing a combination placement of a LADCP and a USBL according to an embodiment of the present disclosure.

Referring to a schematic diagram showing a combination placement of the LADCP and the USBL as shown in FIG. 3, the transducer array is installed at the bottom of the ship, and the underwater transponder is installed at an upper end of a supporting steel frame where the LADCP instrument is located. During the operation, the underwater transponder of the USBL is moved upward and downward in the seawater along with the LADCP, and moves with the movement of the USBL instrument and echoes with the transducer array fixed on the bottom of the ship to obtain the position trajectory data on the LADCP at different instants of time. A set of position information and ocean current data measured by the USBL and the LADCP in combination that are lowered to the seabed is obtained by the apparatus, and the LADCP carries the bottom tracking data. For example, this set of data is observed at an observation station located near the equatorial Pacific, and the time interval obtained from USBL data is 1.95 s.

Figure 4:
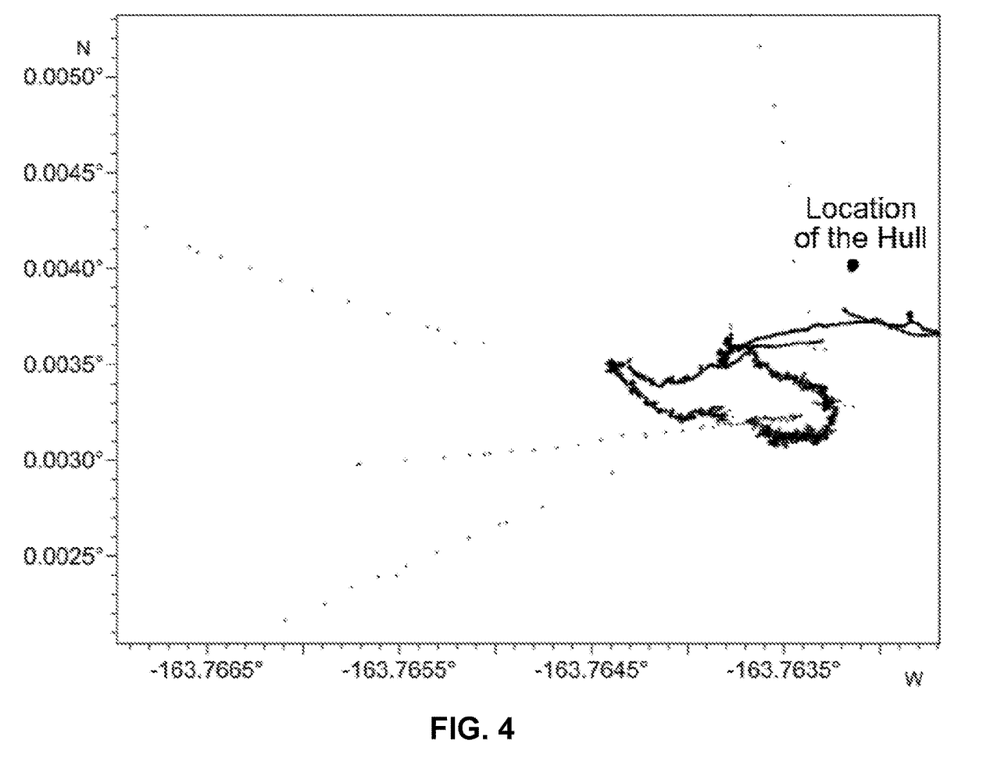
FIG. 4 is a schematic diagram showing position trajectory data according to an embodiment of the present disclosure.

For the position trajectory data, please refer to a schematic diagram showing position trajectory data as shown in FIG. 4, in which each point in FIG. 4 represents the position trajectory of the LADCP. The larger point represents the location where the hull of the ship is located during operation, and the abscissas and ordinates represent range values corresponding to a movement area.

Step S204: removing data fallen outside a preset range from the position trajectory data.

It can be seen from FIG. 4 that some of the data points are obviously irregular, and involve errors or mistakes, and thus need to be removed. The process of the removal is quality control.

A defining method for the removal may be executed by referring to the step of:

(1) removing from the position trajectory data a data point which is away from adjacent data points at an abscissa distance greater than a preset interval; or, (2) removing from the position trajectory data a data point which is away from adjacent data points at an ordinate distance greater than a preset interval. In the observation of ocean currents by the LADCP at this observation station, the measurement time, and the longitudinal position value and the latitudinal position value at which the LADCP instrument is located, which are obtained by the USBL, are recorded as $t_i$, $x_i$, and $y_i$, respectively, where i is a time series for observation at this station, and i=1, 2, 3, ... n. First, position trajectory data obtained by the USBL during the observation operation is plotted, based on which preset range values of the USBL during the operation are given as (−163.7626>x>−163.7645, 0.0030<y<0.0038). Data fallen outside this range is removed, thereby completing the preliminary removal of the abnormal data points in the positioning by the acoustic transponder of the USBL.

Step S206: removing from the position trajectory data a data point which is away from adjacent data points at a distance greater than a preset interval.

In step S204, abnormal data points in the trajectory data cannot be controlled in a small range. Intervals between data points should also be defined, that is, a range control is performed. A defining method for the removal may be executed with reference to the step of:

(1) removing from the position trajectory data a data point which is away from adjacent data points at an abscissa distance greater than a preset interval; or, (2) removing from the position trajectory data a data point which is away from adjacent data points at an ordinate distance greater than a preset interval.

With reference to the movement interval of 1.95 s measured by the USBL and statistics values of the distances between two data points measured at this station, assuming that the underwater movement of the underwater transponder of the USBL has a limit of 4.65 m/s, the abscissa interval range and the ordinate interval range are defined as follows:

$$\text{abs}(x_i - x_{i-1}) \leq 0.00008$$

$$\text{abs}(y_i - y_{i-1}) \leq 0.00008 \quad (1)$$

Figure 5:
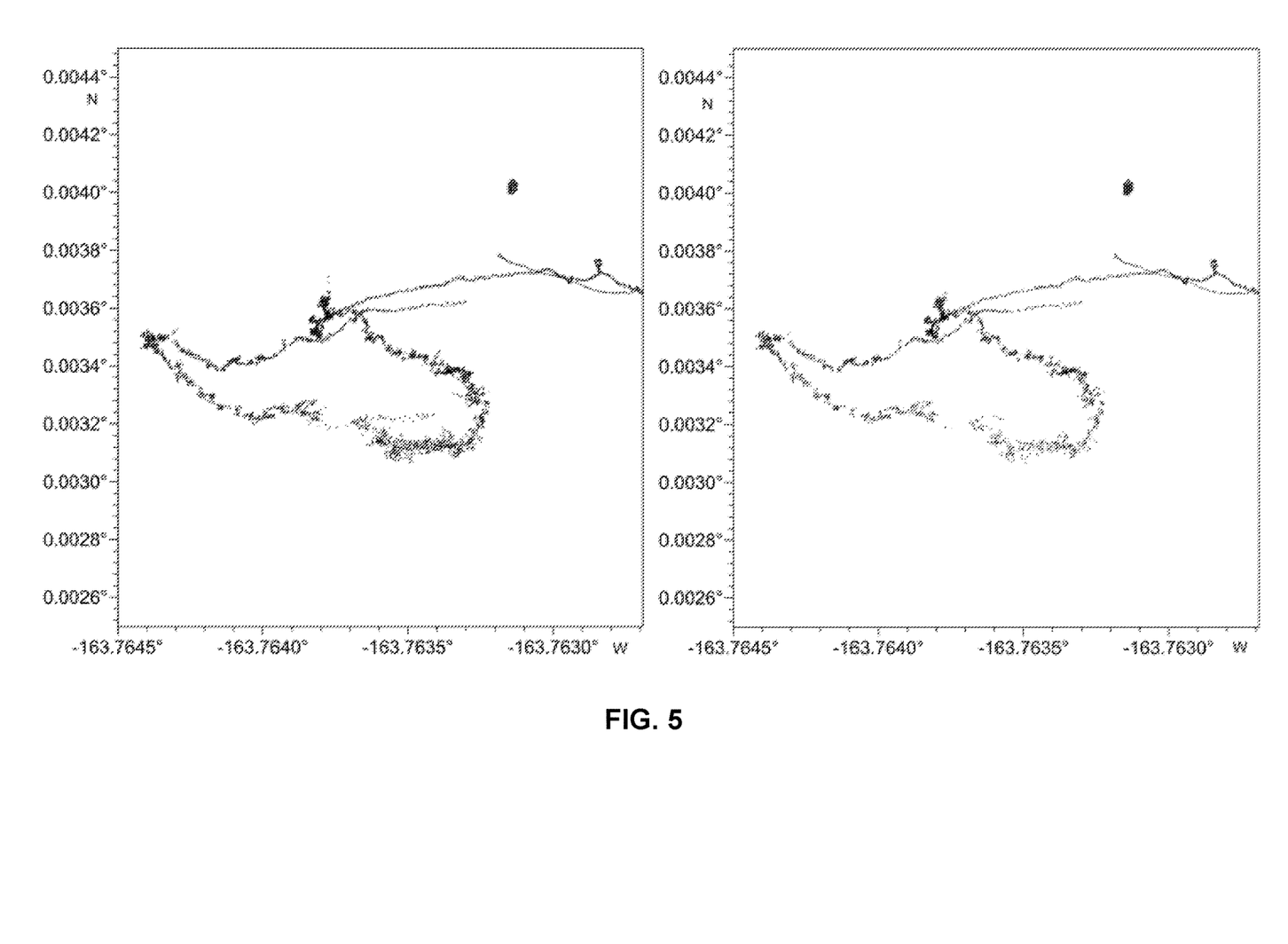
FIG. 5 is a schematic diagram showing a result of control of the quality of a position trajectory measured by the USBL according to an embodiment of the present disclosure.

With the above control of trajectory path of the underwater transponder of the USBL, data outside the ranges is recorded as abnormal data points and thus are removed. For the result of the removal, please refer to the left graph in a schematic diagram as shown in FIG. 5 showing a result of control of the quality of the position trajectory measured by the USBL.

Step S208: removing data fallen outside a preset confidence interval from the position trajectory data.

After the step S204 and the step S206 are performed, some exceptional maximum values still exist. Although the position trajectory data measured by the USBL seems to be normal, the position trajectory data will be converted into velocity values in the calculation of the movement velocity of the LADCP, which will amplify some smaller abnormal values hidden in them. Regarding this, an additional quality control, i.e., confidence interval control, is performed on the position trajectory data, based on the perspective of the movement velocity of the LADCP measured by the USBL.

The movement velocity of the underwater transponder of the USBL during this observation is calculated by:

$$Ue_i = (X_i - X_{i-1})/(T_i - T_{i-1})$$

$$Un_i = (Y_i - Y_{i-1})/(T_i - T_{i-1}) \quad (2)$$

where $Ue_i$ is the movement velocity of the underwater transponder of the USBL in the east-west direction at instant i, $Un_i$ is the movement velocity of the underwater transponder of the USBL in the north-south direction at time i, and $T_i$ is the actual observation time at instant i.

Here, given that a confidence level is 95%, the following formulae are satisfied within the confidence interval:

$$P(\overline{Ue} - 1.96 \times \overline{\delta_{ue}} < Ue_i < \overline{Ue} + 1.96 \times \overline{\delta_{Ue}}) = 0.95$$

$$P(\overline{Un} - 1.96 \times \overline{\delta_{un}} < Un_i < \overline{Un} + 1.96 \times \overline{\delta_{Un}}) = 0.95 \quad (3)$$

where $\overline{Ue}$ is an average movement velocity of the underwater transponder of the USBL in the east-west direction, and $\overline{\delta_{ue}}$ is a standard error of the movement velocity of the underwater transponder of the USBL in the east-west direction; $\overline{Un}$ is an average movement velocity of the USBL in the north-south direction, and $\overline{\delta_{un}}$ is a standard error of the movement velocity of the underwater transponder of the USBL in the north-south direction. Data is accepted or rejected according to formula (3) so that it is ensured that the average value of the sample data will fall within a range of two standard deviations from the overall mean. The data is accepted or rejected based on the confidence interval of the movement velocity of the LADCP measured by the USBL at 95% confidence level, and for example, 639 pieces of data are rejected, and the result of the retained trajectory is shown in the right graph in FIG. 5.

Step S210: performing smoothing filtering on the position trajectory data.

The LADCP of this observation station carries bottom tracking data, and the bottom tracking data lasts for a period of up to 8 minutes and the LADCP dwells at the bottom for a period of about 2 minutes. Thus, the movement velocities of the LADCP within a time period matching that of the bottom tracking data are selected here for comparison therewith.

Figure 6:
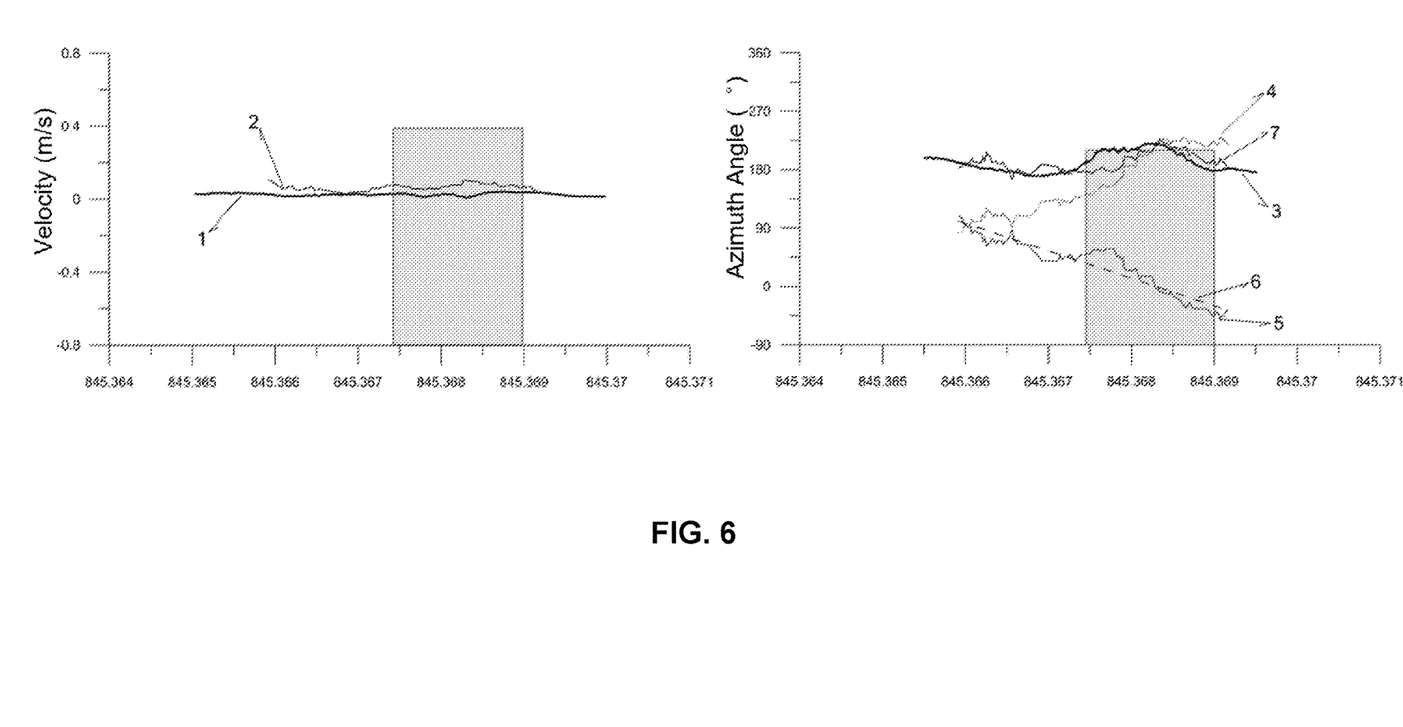
FIG. 6 is a diagram showing comparison between a movement velocity of a LADCP near the bottom and a movement velocity measured by a LADCP using bottom tracking according to an embodiment of the present disclosure.

The underwater transponder of the USBL that is located at a larger horizontal distance from the transducer array will have a larger average positioning error. When the horizontal distance is 100 meters, the error is about 10 meters. In order to eliminate the positioning error, near-bottom reference velocities and bottom tracking velocities are subjected to a smoothing filtering here, respectively. Data on the bottom tracking velocity has a time interval of 1.04 s, data on the movement velocity of the LADCP has a time interval of 1.95 s, the bottom tracking velocities are subjected to a moving average smoothing filtering for 2 minutes, and the movement velocities of the LADCP are subjected to a moving average smoothing filtering for 4 minutes, wherein the filtering is performed on the velocity components in the east-west direction and in the north-south direction, respectively. Moreover, considering that the errors in the USBL are derived from a ranging error and a direction finding error, the filtered movement velocity and bottom tracking velocity are converted into velocity and azimuth angle as two components, respectively, referring to a diagram of comparison between the movement velocity of the LADCP near the bottom and the movement velocity measured by the LADCP using bottom tracking as shown in FIG. 6. In FIG. 6, the left graph shows a distribution of velocities of the LADCP instrument, and the right graph shows a distribution of the angles of movement of the LADCP instrument. Here, line 1 indicates the velocity measured by bottom tracking, and line 2 indicates the value of the movement velocity of the LADCP instrument measured by the USBL; line 3 is an azimuth angle measured by the bottom tracking, line 4 indicates an azimuth angle of the movement of the LADCP instrument measured by the USBL, line 5 indicates a deviation between the azimuth angle obtained by bottom tracking and the azimuth angle of the movement of the LADCP instrument measured by the USBL, line 6 is a straight line fitting to the deviation, and line 7 indicates the corrected azimuth angle of the movement of the LADCP instrument; and the box indicates a period during which the LADCP instrument is dwelling at the bottom.

Step S212: performing an azimuth angle correction on the position trajectory data according to the bottom tracking data to determine the movement velocity of the LADCP.

As shown in FIG. 6, there is a large deviation in azimuth angle, therefore it is necessary to correct the azimuth angle. The specific correction method may be executed by the following steps:

(1) determining a fitted curve according to the bottom tracking data and the position trajectory data in the near-bottom layer.

Optionally, the step of determining a fitted curve is divided into: 1) determining an azimuth angle deviation between the bottom tracking data and the position trajectory data in the near-bottom layer; and 2) linearly fitting the azimuth angle deviation to determine a fitted curve.

An azimuth angle deviation between the previously filtered instrument movement velocities which are measured by the USBL in the near-bottom layer and obtained by the LADCP using bottom tracking is calculated to obtain the azimuth angle deviation therebetween. The deviation value changes obliquely, and the value of the azimuth angle deviation is linearly fitted. First, two points far away from each other are found, with a slope calculated and determined to be −42259.0451, and then a slant distance therebetween is determined to be −2.1736, whereby a fitted straight line is obtained as follows:

$$\Delta J_f = -42259.0451 \times (t_i - 845.3683) - 2.1736 \qquad (4)$$

Thereafter, the azimuth angle deviations $\Delta J_i$ at different instants of time are calculated based on the fitted curve, then value of the corrected azimuth angle is obtained by the azimuth angle of the movement velocity of the LADCP in the near-bottom layer measured by the USBL plus the azimuth angle deviation $\Delta J_i$ calculated from the fitted curve. The corrected result is in good coincidence with the azimuth angle of the movement velocity of the LADCP measured by bottom tracking, and they are particularly close to each other in both varaition trend and magnitude. To this end, statistics are made for average values and mean squared deviations of the movement velocities of the LADCP before and after the correction, as shown in Table 1.

TABLE 1

Table of Comparison between Velocity Values and Azimuth Angle Results of the Instrument Movement Velocities Measured by the USBL in the Near-bottom Layer and Obtained by the LADCP Using Bottom Tracking

| Mode | Measurements by Bottom Tracking | | Measurements by USBL | | Corrected Measurements by USBL | |
| --- | --- | --- | --- | --- | --- | --- |
|  | Velocity (m/s) | Azimuth Angle (°) | Velocity (m/s) | Azimuth Angle (°) | Velocity (m/s) | Azimuth Angle (°) |
| Average Value | 0.0660 | 191.4834 | 0.0671 | 160.6227 | 0.0671 | 191.6203 |
| Mean Squared Deviation | 0.0156 | 15.2696 | 0.0158 | 49.3928 | 0.0158 | 13.2384 |

It can be seen from Table 1 that the average value of the corrected azimuth angle measurements of the LADCP instrument movement velocities measured by the USBL in the near-bottom layer is very close to that of the results measured by the LADCP itself using bottom tracking, the former is 191.6203° and the latter is 191.4834°, and there is only a difference of 0.14° between the two values. Moreover, its corresponding mean squared deviation is also significantly changed. The corrected azimuth angles measured by the USBL have a mean squared deviation of 13.2384°, the bottom tracking data from the LADCP have a mean squared deviation of 15.2696°, and there is also a very small difference between them. Both of the corrected average value and mean squared deviation are much better than the uncorrected results. The corrected result is especially close to the bottom tracking data from the LADCP, which indicates that such correction method is feasibly applicable here.

In addition, in the near-bottom layer, the average value of the velocity measurements of the LADCP instrument movement velocities measured by the USBL is also particularly close to that of the bottom tracking data carried by the LADCP, the former is 0.067 m/s and the latter is 0.066 m/s, and they are generally substantially equal to each other. Moreover, both of them have a relatively small mean squared deviation of about 0.016 m/s.

(2) performing, according to the fitted curve, azimuth angle correction on the position trajectory data over the entire depth profile.

Based on the scheme for correction of the azimuth angle of the movement velocity of the LADCP instrument measured by the USBL in the near-bottom layer, azimuth angles are corrected for the data on movement velocities of the LADCP instrument measured by the USBL over the entire depth profile.

Thereafter, new movement velocities of the instrument LADCP in the east-west direction and in the north-south direction are calculated based on the corrected azimuth angle of the movement velocity of the LADCP instrument measured by the USBL and the original velocity values and then the movement velocities are subjected to temporal Interpolation to obtain movement velocities $VR_t$ of the LADCP instrument with higher time resolution.

Step S214: calculating an absolute velocity of ocean current according to the movement velocity of the LADCP and the ocean current data.

A conventional quality control is performed on the ocean current velocity $VO_t$ measured by the LADCP; and then an absolute velocity $V_t$ of ocean current at each instant of time is calculated by:

$$V_t = VO_t + VR_t$$

Besides, an average absolute velocity of ocean current at a vertical depth may also be calculated, that is, an average velocity of ocean current in each depth layer is calculated. The vertical layers of the ocean currents according to observation by the LADCP are set at intervals ($H_0$), and the velocities $V_t$ within a range of $\pm(5 \times H_0)$ from each depth layer in the vertical direction are averaged to calculate and obtain an absolute velocity of ocean current in each of the depth layers from the sea surface to the seabed.

An average absolute velocity of ocean current in each depth layer is calculated from the absolute velocities of ocean current within a range of $\pm(5 \times H_0)$ from each depth layer by the following formula:

$$V = \frac{1}{n}\sum_{i=1}^{n} V_{ti};$$

where V is the average velocity of ocean current; n is the number of ocean current layers within a range of $\pm(5 \times H_0)$ from the depth layer, and $V_{ti}$ is the absolute velocity of ocean current in the i-th ocean current layer.

Figure 7:
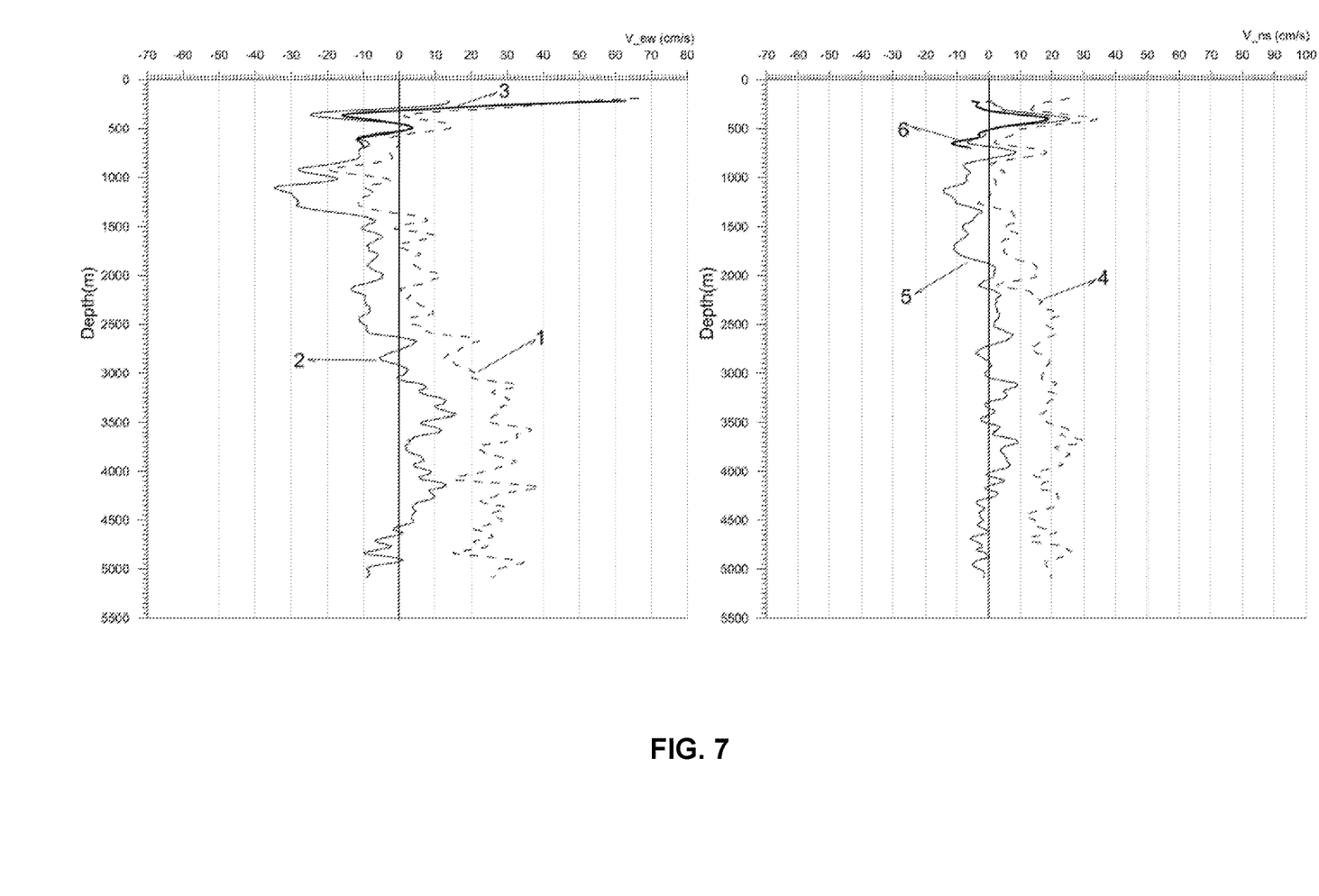
FIG. 7 is a schematic diagram showing a distribution of absolute velocities of ocean currents over an entire depth profile according to an embodiment of the present disclosure.

After the absolute velocity of ocean current in each depth layer is calculated and determined, it may also be verified. The USBL data over the entire depth profile is corrected using the scheme for correction of the azimuth angle included in the near-bottom USBL data, and then is incorporated with the data from the LADCP to calculate and obtain data on absolute velocities of ocean currents over the entire profile, referring to a schematic diagram showing a distribution of absolute velocities of ocean currents over the entire depth profile as shown in FIG. 7. The corrected results exhibit significant differences from the surface layer to the deep layer, as compared with the results calculated from the uncorrected azimuth angles.

In FIG. 7, the left graph shows the absolute velocity of ocean current in the east-west direction, and the right graph shows the absolute velocity of ocean current in the north-south direction. Here, line 1 is obtained from the uncorrected azimuth angles measured by the USBL, line 2 is obtained from the corrected azimuth angles measured by the USBL, and line 3 is measured by a ship-mounted ADCP; line 4 is obtained from the uncorrected azimuth angles measured by the USBL, line 5 is obtained from the corrected azimuth angles measured by the USBL, and line 6 is measured by the underway ADCP.

It is known from Table 2 that, when comparing the absolute ocean current velocity results calculated from the corrected USBL data and the LADCP data in the near-bottom layer with the results obtained by the LADCP using bottom tracking, the absolute velocity values of ocean currents calculated from the USBL data with the corrected azimuth angles are relatively consistent, both in average value and in mean squared deviation, with the bottom tracking measurements, there is only a difference in the order of millimeters, and the difference is not large. When comparing their azimuth angles, the average values of their azimuth angles are substantially consistent with each other and have a difference of within 10°, and their mean squared deviations are substantially close to each other and are both less than 10°. Obviously, the absolute velocity results of ocean currents in the near-bottom layer calculated by this mode are very close to the results observed by the LADCP using bottom tracking.

TABLE 2

Comparison between Absolute Ocean Current Velocities Calculated in this Method and the Results Directly Obtained by Bottom Tracking

| Mode | Calculation by Bottom Tracking | | Calculation from the USBL Data with the Corrected Azimuth Angles | |
|---|---|---|---|---|
| | Velocity (cm/s) | Azimuth Angle | Velocity (cm/s) | Azimuth Angle |
| Average Value | 8.36 | 194.34 | 8.28 | 202.27 |
| Mean Squared Deviation | 1.33 | 9.23 | 1.81 | 9.98 |

In order to further verify the authenticity of the absolute velocities of ocean currents obtained by this method, they are compared with average velocities of ocean currents in the upper layer (<700 m) for 3.5 hours, which are measured by a ship-mounted ADCP during operation in a state where the ship is stopped at this station. The absolute velocities of ocean current in the upper layer profile at this station calculated based on the ADCP instrument movement velocities measured by the USBL with the corrected azimuth angles exhibit a vertical variation trend particularly close to that of the average velocity results of ocean currents observed by the ship-mounted ADCP (as indicated by FIG. 7). The magnitudes of the measurements of ocean current velocities in the east-west direction and in the north-south direction are in good coincidence with the results obtained by the ship-mounted ADCP. Thus, it can be seen that the LADCP-USBL combined observation and subsequent data processing method used herein can truly reflect a distribution of ocean current velocities in vertical depth profiles at a single station and well solve the problem of lack of movement velocity of the LADCP instrument in the observation of ocean currents by the LADCP.

In the mode described above, firstly, data fallen outside a preset range is removed from the position trajectory data; data having an interval greater than a preset interval with respect to adjacent data is removed from the position trajectory data; data fallen outside a preset confidence interval is removed from the position trajectory data; and the position trajectory data is subjected to smooth filtering. Secondly, a fitted curve is determined according to the bottom tracking data and the position trajectory data in the near-bottom layer; and azimuth angle correction is performed on the position trajectory data according to the fitted curve. The procedures of the quality control method and the azimuth angle correction method are clarified, whereby the movement velocity of the LADCP can be accurately determined, accuracy of calculation of ocean current velocities can be improved, and error of the calculation of the ocean current velocities can be reduced.

It should be noted that the above method embodiments are described in a progressive manner, each embodiment focuses on the differences from other embodiments, and the same or similar parts between the embodiments may be understood with mutual reference to each other.

Figure 8:
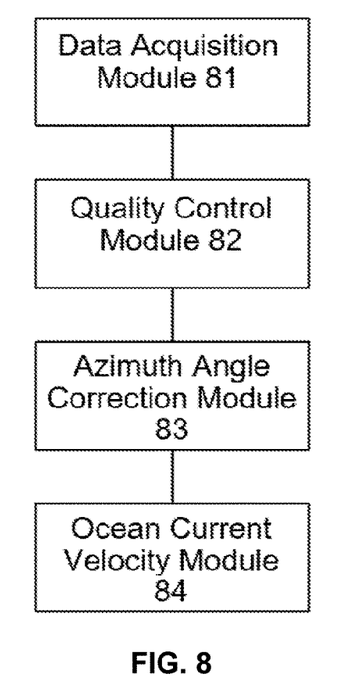
FIG. 8 is a schematic structural diagram of a LADCP-USBL combined observation and data processing apparatus according to an embodiment of the present disclosure.

Corresponding to the above method embodiments, an embodiment of the present disclosure provides a LADCP-USBL combined observation and data processing apparatus (apparatus for observation and data processing with LADCP and USBL used in combination), which is applicable to an electronic device. As shown in FIG. 8, the apparatus comprises:

a data acquisition module 81 configured to acquire bottom tracking data from the LADCP, position trajectory data collected by the USBL, and ocean current data collected by the LADCP;

a quality control module 82 configured to remove abnormal data points from the position trajectory data;

an azimuth angle correction module 83 configured to perform an azimuth angle correction on the position trajectory data according to the bottom tracking data to determine a movement velocity of the LADCP; and an ocean current velocity module 84 configured to calculate an absolute velocity of ocean current according to the movement velocity of the LADCP and the ocean current data.

In a LADCP-USBL combined observation and data processing apparatus according to an embodiment of the present disclosure, after abnormal data points are removed from position trajectory data collected by the USBL, azimuth angle correction is performed on the position trajectory data using bottom tracking data to determine a movement velocity of the LADCP, and an absolute velocity of ocean current is calculated according to the movement velocity of the LADCP and ocean current data collected by the LADCP. In this way, the movement velocity of the LADCP can be accurately determined, accuracy of the calculation of the ocean current velocity can be improved, and error of the calculation of the ocean current velocity can be reduced.

In some embodiments, the quality control module is configured to: remove data fallen outside a preset range from the position trajectory data; remove data having an interval greater than a preset interval with respect to adjacent data from the position trajectory data; remove data fallen outside a preset confidence interval from the position trajectory data; and performing smooth filtering on the position trajectory data.

In some embodiments, the quality control module is further configured to: remove data whose abscissas are fallen outside a preset abscissa range from the position trajectory data; or remove data whose ordinates are fallen outside a preset ordinate range from the position trajectory data.

In some embodiments, the quality control module is further configured to: remove data whose abscissas have an interval with respect to adjacent data that is greater than a preset abscissa interval from the position trajectory data; or remove data whose ordinates have an interval with respect to adjacent data which is greater than a preset ordinate interval from the position trajectory data.

In some embodiments, the azimuth angle correction module is configured to: determine a fitted curve according to the bottom tracking data and the position trajectory data in a near-bottom layer; and perform azimuth angle correction on the position trajectory data according to the fitted curve.

In some embodiments, the azimuth angle correction module is further configured to: determine azimuth angle deviations between the bottom tracking data and the position trajectory data in the near-bottom layer; and linearly fit the azimuth angle deviations to determine a fitted curve.

In some embodiments, the apparatus described above is further configured to calculate an average absolute velocity of ocean current in each depth layer according to the absolute velocities of ocean currents within a range of $\pm(m \times H_0)$ from each depth layer by the following formula:

$$V = \frac{1}{n}\sum_{i=1}^{n} V_{ti};$$

where V is the average velocity of ocean current in each depth layer; n is the number of ocean current layers within a range of $\pm(m \times H_0)$ from each depth layer, $V_{ti}$ is the absolute velocity of ocean current in the i-th ocean current layer, $H_0$ is an interval at which the ocean current observation layers are set in the observation by the LADCP, and $\pm(m \times H_0)$ is a range defined by upper and lower limits for data on the ocean current layers involved in the calculation of the average velocity of ocean current in each depth layer.

The LADCP-USBL combined observation and data processing apparatus according to the embodiment of the present disclosure has the same technical features as the LADCP-USBL combined observation and data processing method according to the above embodiment, and thus can also solve the same technical problems and achieve the same technical effects.

Figure 9:
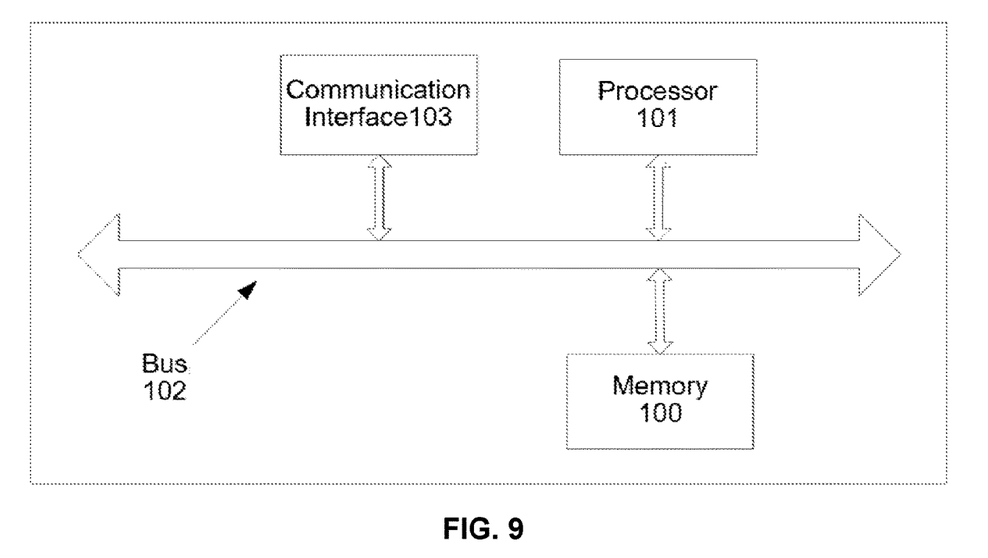
FIG. 9 is a schematic structural diagram of an electronic device according to an embodiment of the present disclosure.

An embodiment of the present disclosure further provides an electronic device configured to run the LADCP-USBL combined observation and data processing method described above. Referring to FIG. 9, the electronic device comprises a memory 100 and a processor 101, wherein the memory 100 is configured to store one or more computer instructions, and the one or more computer instructions are executed by the processor 101 to implement the LADCP-USBL combined observation and data processing method described above.

Optionally, the electronic device shown in FIG. 9 further comprises a bus 102 and a communication interface 103, and the processor 101, the communication interface 103, and the memory 100 are connected via the bus 102.

Here, the memory 100 may include a high-speed random access memory (RAM), or may also include a non-volatile memory, for example, at least one disk memory. The communication connection between the network element of the system and at least one other network element is implemented by at least one communication interface 103 (which may be wired or wireless), in which the Internet, a wide area network, a local area network, a metropolitan area network, or the like may be used. The bus 102 may be an ISA bus, a PCI bus, an EISA bus, or the like. The bus may be divided into an address bus, a data bus, a control bus, and so on. For ease of representation, the bus is represented with only one bidirectional arrow in FIG. 9, but it is not meant that there is only one bus or one type of bus.

The processor 101 may be an integrated circuit chip having signal processing capability. During implementation, each of the steps of the above method may be completed by an integrated logic circuit of hardware in the processor 101 or by instructions in the form of software. The above-mentioned processor 101 may be a general-purpose processor, including a central processing unit (referred simply to as CPU), a network processor (referred simply to as NP), and so on, or may be a digital signal processor (referred simply to as DSP), an application specific integrated circuit (referred simply to as ASIC), a field-programmable gate array (referred simply to as FPGA) or any other programmable logic device, discrete gate or transistor logic device, or discrete hardware component. The methods, steps, and logical block diagrams disclosed in the embodiments of the present disclosure may be implemented or executed. The general-purpose processor may be a microprocessor, or the processor may be any conventional processor or the like. The steps of the methods disclosed in connection with the embodiments of the present disclosure may be directly embodied as being executed and completed by a hardware decoding processor, or executed and completed by a combination of the hardware in the decoding processor and a software module. The software module may be located in a storage medium well-developed in the art, such as a random access memory, a flash memory, a read-only memory, a programmable read-only memory, an electrically erasable programmable memory, a register, or the like. The storage medium is located in the memory 100, and the processor 101 reads information from the memory 100 and completes the steps of the methods in the foregoing embodiments in combination with its hardware.

An embodiment of the present disclosure further provides a computer-readable storage medium, wherein the computer-readable storage medium is configured to store computer-executable instructions, and the computer-executable instructions, when being invoked and executed by a processor, causing the processor to implement the LADCP-USBL combined observation and data processing method described above. The implementation thereof may be understood with reference to the method embodiments and therefore will not be described in detail here.

A computer program product of the LADCP-USBL combined observation and data processing method according to an embodiment of the present disclosure includes a computer-readable storage medium in which program codes are stored, and the program codes include instructions which may be configured to execute the method in the foregoing method embodiment. The implementation thereof may be understood with reference to the method embodiment and therefore will not be described in detail here.

It can be clearly appreciated by those skilled in the art that for the convenience and conciseness of the description, the specific operating processes of the apparatus and/or the electronic device described above may be understood with reference to the corresponding process in the foregoing method embodiments and therefore will not be described in detail here.

Finally, it should be noted that the embodiments described above are merely specific embodiments of the present disclosure for illustrating the technical solutions of the present disclosure, but not intended to limit the present disclosure, and the scope of protection of the present disclosure is not limited thereto. Although the present disclosure has been described in detail with reference to the foregoing embodiments, it should be understood by those skilled in the art that, any person skilled in the art may make modification or readily conceivable variations to the technical solutions disclosed in the foregoing embodiments or substitute some of the technical features with equivalents within the scope of the technique disclosed in the present disclosure; and all such modifications, variations, or substitutions will not cause the gist of the corresponding technical solutions to depart from the essence and scope of the technical solutions of the embodiments of the present disclosure and should be covered by the scope of protection of the present disclosure. Therefore, the scope of protection of the present disclosure should be determined based on the scope of the claims.

What is claimed is:

1. A lowered acoustic doppler current profiler, ultra-short baseline (LADCP-USBL) combined observation and data processing method, the method comprising:
  acquiring bottom tracking data from a lowered acoustic doppler current profiler (LADCP), and position trajectory data collected by an ultra-short baseline (USBL) and ocean current data collected by the LADCP;
  removing abnormal data points from the position trajectory data;
  performing azimuth angle correction on the position trajectory data according to the bottom tracking data to determine a movement velocity of the LADCP; and
  calculating an absolute ocean current velocity according to the movement velocity of the LADCP and the ocean current data;
  wherein the step of performing azimuth angle correction on the position trajectory data according to the bottom tracking data comprises:
    determining a fitted curve according to the bottom tracking data and the position trajectory data in a near-bottom layer; and
    performing azimuth angle correction on the position trajectory data according to the fitted curve.

2. The method of claim 1, wherein the step of removing abnormal data points from the position trajectory data comprises:
  removing data fallen outside a preset range from the position trajectory data;
  removing from the position trajectory data a data point which is away from adjacent data points at a distance greater than a preset interval;
  removing data fallen outside a preset confidence interval from the position trajectory data; and
  performing smooth filtering on the position trajectory data.

3. The method of claim 2, wherein the step of removing data fallen outside a preset range from the position trajectory data comprises:
  removing from the position trajectory data a data point which is away from adjacent data points at an abscissa distance greater than a preset interval; or removing from the position trajectory data a data point which is away from adjacent data points at an ordinate distance greater than a preset interval.

4. The method of claim 2, wherein the step of removing from the position trajectory data a data point which is away from adjacent data points at a distance greater than a preset interval comprises:

removing from the position trajectory data a data point which is away from adjacent data points at an abscissa distance greater than a preset interval; or removing from the position trajectory data a data point which is away from adjacent data points at an ordinate distance greater than a preset interval.

5. The method of claim 1, wherein the step of determining a fitted curve according to the bottom tracking data and the position trajectory data in a near-bottom layer comprises:

determining azimuth angle deviations between the bottom tracking data and the position trajectory data in the near-bottom layer; and linearly fitting the azimuth angle deviations to determine a fitted curve.

6. The method of claim 1, further comprising:

calculating an average velocity of ocean current in each depth layer according to the absolute velocities of ocean currents within a range of $\pm(m \times H_0)$ from each depth layer by the following formula:

$$V = \frac{1}{n}\sum_{i=1}^{n} V_{ti};$$

where V is the average velocity of ocean current; n is the number of ocean current layers within a range of $\pm(m \times H_0)$ from each depth layer, $V_{ti}$ is an absolute velocity of ocean current in the i-th ocean current layer, $H_0$ is an interval at which the ocean current observation layers are set in the observation by the LADCP, and $\pm(m \times H_0)$ is a range defined by upper and lower limits of data on the ocean current layers involved in the calculation of the average velocity of ocean current in each depth layer.

7. A lowered acoustic doppler current profiler, ultra-short baseline (LADCP-USBL) combined observation and data processing apparatus, comprising:

a data acquisition module configured to acquire bottom tracking data from the LADCP, and position trajectory data collected by the USBL and ocean current data collected by the LADCP;

a quality control module configured to remove abnormal data points from the position trajectory data;

an azimuth angle correction module configured to perform azimuth angle correction on the position trajectory data according to the bottom tracking data to determine a movement velocity of the LADCP, determine a fitted curve according to the bottom tracking data and the position trajectory data in a near-bottom layer; and perform azimuth angle correction on the position trajectory data according to the fitted curve; and an ocean current velocity module configured to calculate an absolute velocity of ocean current based on the movement velocity of the LADCP and the ocean current data.

8. An electronic device, comprising a processor and a memory, wherein the memory is configured to store computer-executable instructions executable by the processor, and the processor is configured to execute the computer-executable instructions to implement the LADCP-USBL combined observation and data processing method of claim 1.

9. An electronic device, comprising a processor and a memory, wherein the memory is configured to store computer-executable instructions executable by the processor, and the processor is configured to execute the computer-executable instructions to implement the LADCP-USBL combined observation and data processing method of claim 2.

10. An electronic device, comprising a processor and a memory, wherein the memory is configured to store computer-executable instructions executable by the processor, and the processor is configured to execute the computer-executable instructions to implement the LADCP-USBL combined observation and data processing method of claim 3.

11. An electronic device, comprising a processor and a memory, wherein the memory is configured to store computer-executable instructions executable by the processor, and the processor is configured to execute the computer-executable instructions to implement the LADCP-USBL combined observation and data processing method of claim 4.

12. An electronic device, comprising a processor and a memory, wherein the memory is configured to store computer-executable instructions executable by the processor, and the processor is configured to execute the computer-executable instructions to implement the LADCP-USBL combined observation and data processing method of claim 5.

13. An electronic device, comprising a processor and a memory, wherein the memory is configured to store computer-executable instructions executable by the processor, and the processor is configured to execute the computer-executable instructions to implement the LADCP-USBL combined observation and data processing method of claim 6.

* * * * *